(12) United States Patent
Okawa et al.

(10) Patent No.: US 10,720,780 B2
(45) Date of Patent: *Jul. 21, 2020

(54) BATTERY CONTROL IC, BATTERY PACK, AND AUTHENTICATION METHOD THEREOF

(71) Applicant: Renesas Electronics Corporation, Tokyo (JP)

(72) Inventors: Masayoshi Okawa, Tokyo (JP); Hiromasa Takahashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 16/052,870

(22) Filed: Aug. 2, 2018

(65) Prior Publication Data

US 2018/0375343 A1 Dec. 27, 2018

Related U.S. Application Data

(63) Continuation of application No. 14/992,912, filed on Jan. 11, 2016, now Pat. No. 10,044,198.

(30) Foreign Application Priority Data

Mar. 31, 2015 (JP) ................................. 2015-070690

(51) Int. Cl.
*H02J 7/00* (2006.01)
(52) U.S. Cl.
CPC ....... *H02J 7/00036* (2020.01); *H02J 7/00045* (2020.01)
(58) Field of Classification Search
CPC ............................ H02J 7/0004; H02J 7/00036
(Continued)

(56) References Cited

U.S. PATENT DOCUMENTS 6,975,092 B2 12/2005 Edington et al.
7,564,214 B2 7/2009 Sasaki et al.
(Continued)

FOREIGN PATENT DOCUMENTS

JP 3833679 B2 10/2006
JP 2007-282471 A 10/2007
(Continued)

OTHER PUBLICATIONS

Japanese Office Action, dated Sep. 4, 2018, in Japanese Application No. 2015-070690 and English Translation thereof.
(Continued)

*Primary Examiner* — Zixuan Zhou
(74) *Attorney, Agent, or Firm* — McDermott Will & Emery LLP

(57) ABSTRACT

A battery authentication system includes a battery pack, and a host device connected to the battery pack to charge the battery pack. The battery pack includes a battery, a discharge switch that turns on and off discharging of the battery, a charge switch that turns on and off charging of the battery, and a control integrated circuit (IC) that controls the battery. The control IC includes a charge/discharge control circuit that controls the discharge switch and the charge switch, and an authentication circuit that performs a process for performing an authentication with the host device. The authentication circuit is configured to perform a process associated with a first authentication. The charge/discharge control circuit is configured to control the discharge switch to be turned on when the first authentication is established. The authentication circuit is configured to perform a process associated with a second authentication.

20 Claims, 7 Drawing Sheets

(58) Field of Classification Search
USPC .......................................... 320/106, 112, 128
See application file for complete search history.

(56) References Cited

U.S. PATENT DOCUMENTS

| | | | |
|---|---|---|---|
| 2006/0208850 A1 | 9/2006 | Ikeuchi | |
| 2007/0214293 A1* | 9/2007 | Gangstoe | .............. H04L 9/0662 |
| | | | 710/52 |
| 2007/0214296 A1 | 9/2007 | Takamatsu | |
| 2009/0292918 A1* | 11/2009 | Mori | ........................ G06F 21/31 |
| | | | 713/168 |
| 2012/0314796 A1 | 12/2012 | Hori et al. | |

FOREIGN PATENT DOCUMENTS

| | | |
|---|---|---|
| JP | 2009-015744 A | 1/2009 |
| JP | 2012-256975 A | 12/2012 |

OTHER PUBLICATIONS

Office Action in U.S. Appl. No. 14/992,912, dated Sep. 27, 2017.
Notice of Allowance in U.S. Appl. No. 14/992,912, dated Apr. 12, 2018.

* cited by examiner

BATTERY CONTROL IC, BATTERY PACK, AND AUTHENTICATION METHOD THEREOF

The present application is a Continuation Application of U.S. patent application Ser. No. 14/992,912, filed on Jan. 11, 2016, which is based on and claims priority from Japanese patent application No. 2015-070690, filed on Mar. 31, 2015, the entire contents of which are incorporated herein by reference.

BACKGROUND

The present invention relates to a battery control IC, a battery pack, and an authentication method thereof.

A rechargeable secondary battery is used as a power supply for electronic devices such as a laptop computer and an electric power tool. Such a secondary battery is built in many battery packs which are detachably mounted on electronic devices. For example, Japanese Patent No. 3833679 discloses a technique for charging a battery pack. Further, the specification of U.S. Pat. No. 6,975,092 discloses a technique for charging a smart battery.

SUMMARY

In recent years, along with the popularization of electronic devices as described above, non-authentic (counterfeit) battery packs have been distributed. The use of such non-authentic battery packs for the electric devices may cause an overcurrent or overheating, which may result in the occurrence of a failure in the electronic devices.

Other problems to be solved by and novel features of the present invention will be apparent from the following description and the accompanying drawings.

A first aspect of the present invention is a battery pack authentication method including: performing a first authentication in a common key system between a battery pack and a host device; and performing a control to enable the battery pack to perform a discharge operation when the first authentication is established.

Even when the device according to the first aspect is replaced by a method, a system, or a program for causing a computer to execute the device or a part of processing of the device, it can still be effective as one aspect of the present invention.

According to the first aspect, it is possible to limit the use of non-authentic battery packs.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
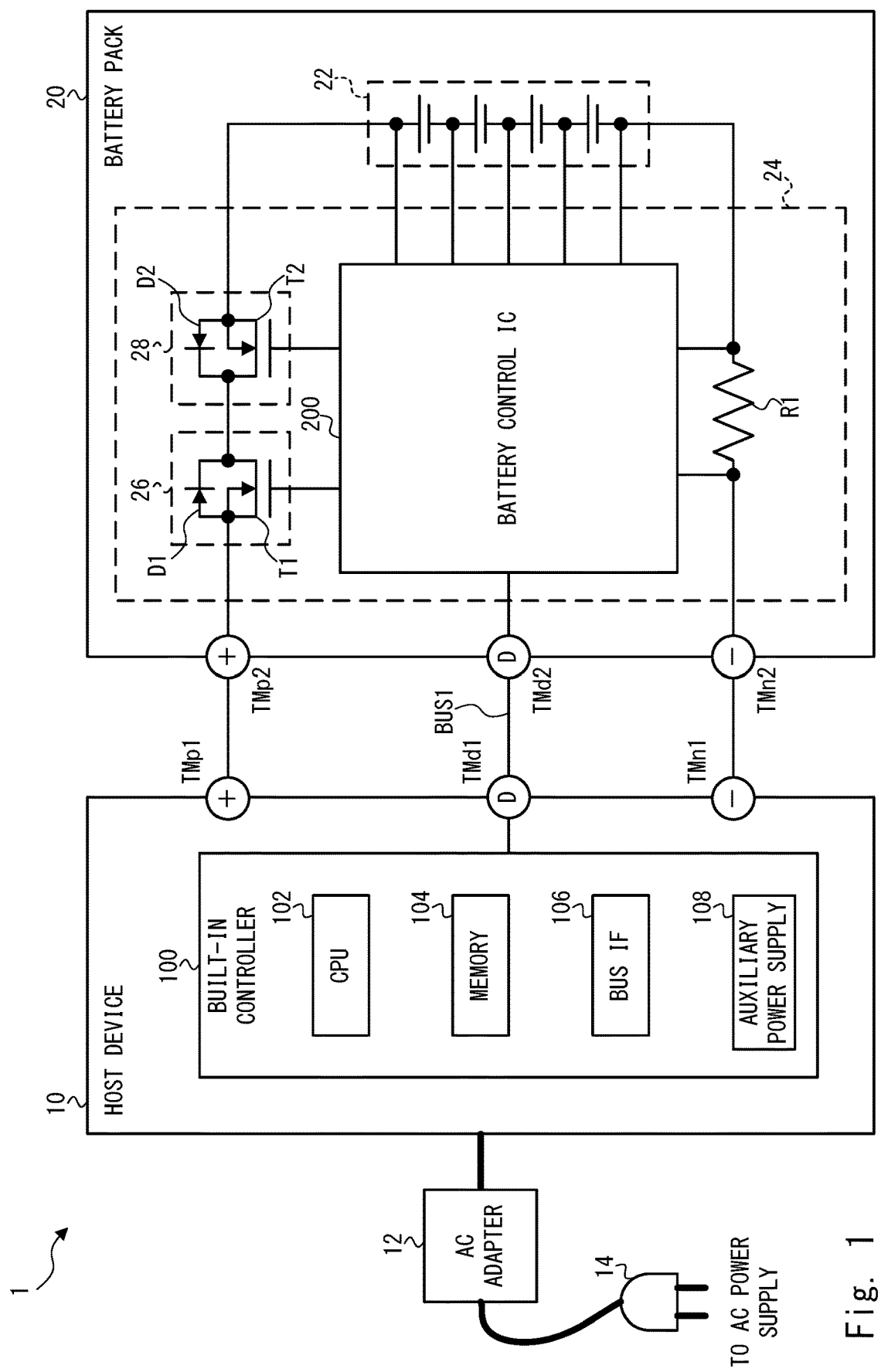
FIG. 1 is a diagram showing a battery authentication system according to a first embodiment.

An embodiment will be described below with reference to the drawings. The following description and the drawings are abbreviated or simplified as appropriate for clarity of explanation. Note that in the drawings, the same elements are denoted by the same reference numerals, and a repeated description is omitted as needed.

In the following embodiment, explanations are made by referring to several sections or several embodiments for convenience, as required, but they are mutually related, and are in such a relation to each other that one of them is a modified example, an application example, a detailed explanation, a supplemental explanation, or the like of a part or all of the other, unless otherwise specified. Further, in the following embodiment, when the number of elements (including the number of items, numerical value, quantity, range, etc.) or the like is mentioned, the number is not limited to that specific number, and may be larger or smaller than the mentioned number, except for the case where it is explicitly indicated that the number should be the specifically-mentioned number or it is theoretically clear that the number should be limited to the specifically-mentioned number.

Further, in the following embodiment, the constituent elements thereof (including operation steps etc.) are not necessarily indispensable, except for the case where it is explicitly indicated that a specific element is indispensable, or it is theoretically clear that a specific element is indispensable. Similarly, in the following embodiment, when shapes, positional relationships, etc. of the constituent elements are mentioned, they include substantially similar or analogous shapes and so forth, except for the case where it is explicitly indicated or it is theoretically clear that the above is not true. This also applies to the above-mentioned values (including the number of items, numerical value, quantity, range, etc.) and the like.

The elements illustrated in the drawings as functional blocks for performing various processes can be implemented hardwarewise by a CPU (Central Processing Unit), a memory, and other circuits, and softwarewise by a program loaded into a memory or the like. Accordingly, it is understood by those skilled in the art that these functional blocks can be implemented in various forms including, but not limited to, hardware alone, software alone, and a combination of hardware and software.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Comparative Example and Problems Thereof

Prior to the description of the embodiment of the present invention, a comparative example to be compared with the embodiment of the present invention will be described.

In order to limit the use of non-authentic battery packs, a battery pack authentication is performed in a common key system using, for example, a SHA-1 (Secure Hash Algorithm 1) system, when a battery pack is mounted on an electronic device. When the authentication is established and it is verified that the battery pack is an authentic product, the use (charging and discharging) of the battery pack is permitted.

An example of the authentication method is a challenge-response system. In the challenge-response system, for example, data is exchanged between a built-in controller which is built in an electronic device and a control IC which is built in a battery pack. Specifically, the electronic device transmits random data (challenge data, random number) to the battery pack. The battery pack which has received the random data uses an authentication key (a common key in this case), which is held in the battery pack, to generate signature data (response data) from the random data, and transmits the generated signature data to the electronic device.

The electronic device performs a data generation process in the same manner as that of the battery pack by using an authentication key (a common key in this case), which is held in the electronic device, and compares the generated data with the received signature data. When the generated data matches the received signature data, the electronic device determines that the battery pack is an authentic product. In other words, the authentication is established in this case, and thus the use of the battery pack is permitted.

Meanwhile, the security level of the common key authentication system using SHA-1 is lower than that of a public key authentication system to be described later, which may cause cracking of the authentication of the common key authentication system. Accordingly, in the authentication using the common key authentication system, there is a possibility that the authentication of a non-authentic product will be established. In this case, the use of the non-authentic battery pack may be permitted.

On the other hand, there is a method for performing an authentication of a battery in the public key authentication system using, for example, an ECC (Elliptic Curve Cryptography) system, when the battery is mounted on an electronic device. The security level of the public key authentication system is higher than that of the common key authentication system, so that cracking of the authentication of the public key authentication system is suppressed. For example, the challenge-response system as described above is used as an authentication method.

Meanwhile, the use of the public key authentication system may cause an increase in the time required for the authentication. For the purpose of cost reduction, for example, a low-end controller which is a low-cost and low-performance controller is often used as the controller built in the electronic device. However, the authentication using such a low-end controller may cause a further increase in the time required for the authentication. The above-mentioned problems have been found by the present inventors.

In the embodiment of the present invention, the above-mentioned problems can be solved by the configuration as described below. In other words, the time required for the authentication can be shortened in comparison to the case of performing the authentication using the public key system. Further, the security level can be improved in comparison to the case of performing the authentication using the common key system.

Note that the term "low-end controller" refers to a controller with a low arithmetic processing performance. The "low-end controller" is, for example, a controller incorporating a CPU with a processing performance of about 1 MIPS (Million Instructions Per Second)/MHz or less. For example, the low-end controller incorporates a CPU with a performance of about 8 bits or 16 bits. In practice, the processing performance of the low-end controller varies depending on the presence or absence of peripheral functions, and thus the value "1 MIPs/MHz" is merely a rough estimate. Accordingly, a controller with a processing performance of more than 1 MIPs/MHz may be used as the low-end controller, while a controller with a processing performance slightly lower than 1 MIPs/MHz may not be used as the low-end controller.

First Embodiment

An embodiment of the present invention will be described below with reference to the drawings.
(Battery Authentication System 1)
FIG. 1 is a diagram showing a battery authentication system 1 according to a first embodiment. As shown in FIG. 1, a battery authentication system 1 includes a host device 10 and a battery pack 20. The host device 10 is an electronic device such as a laptop computer. The battery pack 20 is detachably mounted on the host device 10.

When the battery pack 20 is mounted on the host device 10, a positive terminal TMp1 of the host device 10 is connected to a positive terminal TMp2 of the battery pack 20, and a negative terminal TMn1 of the host device 10 is connected to a negative terminal TMn2 of the battery pack 20. The host device 10 (a built-in controller 100 to be described later) and the battery pack 20 (a battery control IC 200 to be described later) can be connected to each other via a bus BUS1 so that they can communicate with each other. The bus BUS1 is preferably a SMBus (System Management Bus). When the battery pack 20 is mounted on the host device 10, a communication terminal TMd1 of the host device 10 and a communication terminal TMd2 of the battery pack 20 are connected to each other.
(Host Device 10)
The host device 10 is supplied with power from an external power supply such as an AC power supply. Specifically, when a power supply plug 14 is connected to an outlet of the AC power supply, an AC adapter 12 converts AC power into DC power. The DC power is supplied to the host device 10. The host device 10 can charge the battery pack 20 by the power supplied from the external power supply. On the other hand, when the power supply plug 14 is not connected to the outlet of the AC power supply and no power is supplied to the host device 10 from the external power supply, the host device 10 is supplied with a discharge current from the battery pack 20, and thus can be supplied with power.

(Built-in Controller 100)

The host device 10 includes the built-in controller 100. The built-in controller 100 is an embedded controller (EC) that performs the management of the power supply of the host device 10 and the authentication of the battery pack. The built-in controller 100 can be configured as a microcomputer, a semiconductor integrated circuit, or a semiconductor device.

The built-in controller 100 includes a CPU 102, a memory 104, and a bus interface 106 (bus IF). The CPU 102 is a central processing circuit that executes a program stored in the memory 104 and performs a control for the management of the power supply and the authentication of the battery pack 20. The bus interface 106 is preferably a SMBus interface (IF), and performs a process necessary for the built-in controller 100 to communicate with the battery pack 20 (the battery control IC 200 to be described later) via the bus BUS1.

Further, as described later, the built-in controller 100 performs a process for performing an authentication as to whether the battery pack 20 is an authentic product or not. The built-in controller 100 communicates with the battery pack 20 (the battery control IC 200 to be described later) via the bus BUS1, and performs an authentication process on the battery pack 20. The built-in controller 100 incorporates an authentication software library for performing the authentication process. In this case, the authentication software library is compatible with two authentication systems, i.e., a common key system and a public key system. In the first embodiment, a SHA256 system is used as the common key authentication system and an ECC system is used as the public key authentication system. However, the authentication systems to be used are not limited to these systems.

The built-in controller 100 includes an auxiliary power supply 108. When the host device 10 is not supplied with power from the external power supply and the authentication as to whether the battery pack 20 is an authentic product or not is not completed, the built-in controller 100 is supplied with power from the auxiliary power supply 108 and thereby performs the authentication process and the like. Although the auxiliary power supply 108 is incorporated in the built-in controller 100, the built-in controller 100 may be supplied with power from the outside of the built-in controller 100.

(Battery Pack 20)

The battery pack 20 includes a battery 22 and a wiring substrate 24. The battery 22 is a rechargeable secondary battery or the like. The battery control IC 200, which controls the battery 22, a resistor element R1, a discharge switch 26, and a charge switch 28 are mounted on the wiring substrate 24. In the first embodiment, the battery control IC 200, the discharge switch 26, and the charge switch 28 are formed on different semiconductor chips, respectively, but need not necessarily be formed on different chips.

The discharge switch 26 includes a diode D1 and a transistor T1 such as a MOSFET (Metal Oxide Semiconductor Field Effect. Transistor). The discharge switch 26 is controlled to be turned on or off by the battery control IC 200. When the discharge switch 26 is turned on, a discharge current from the battery 22 is supplied to the host device 10. Thus, the battery 22 is discharged. That is, the discharge switch 26 is a circuit for turning on and off discharging of the battery 22.

The charge switch 28 includes a diode D2 and a transistor T2 such as a MOSFET. The charge switch 28 is controlled to be turned on or off by the battery control IC 200. When the charge switch 28 is turned on, a charge current from the host device 10 is supplied to the battery 22. Thus, the battery 22 is charged. That is, the charge switch 28 is a circuit for turning on and off charging of the battery 22.

(Battery Control IC 200)

Figure 2:
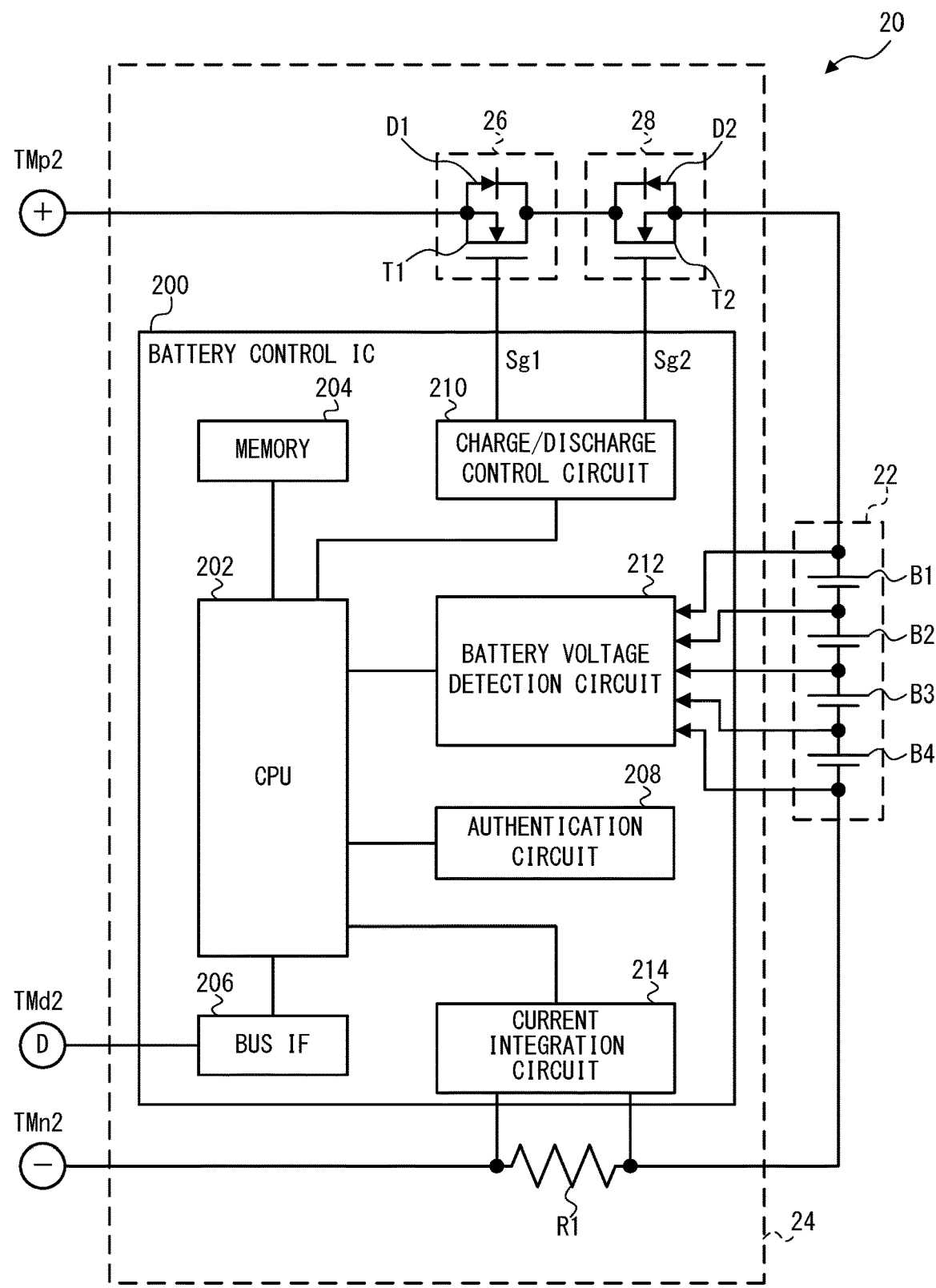
FIG. 2 is a diagram showing details of a battery control IC shown in FIG. 1.

FIG. 2 is a diagram showing details of the battery control IC 200 shown in FIG. 1. For convenience of explanation, FIG. 2 also illustrates components at the periphery of the battery control IC 200. The battery control IC 200 is, for example, a fuel gauge integrated circuit (FIGC). The battery control IC 200 includes a CPU 202, a memory 204, a bus interface 206 (bus IF), an authentication circuit 208, a charge/discharge control circuit 210, a battery voltage detection circuit 212, and a current integration circuit 214.

The CPU 202 controls operations of other components in the battery control IC 200. The memory 204 is, for example, a storage device, such as a flash memory. The memory 204 stores a program for causing the CPU 202 to operate. The memory 204 can also store data indicating the state of the battery 22 (for example, the remaining amount, temperature, and the like of the battery 22).

The CPU 202 is a central processing circuit that executes a program stored in the memory 204, and monitors and controls the battery 22. Further, the CPU 202 executes the program stored in the memory 204 and performs a control for authentication of the battery pack 20. Specifically, as described later, the CPU 202 controls the authentication circuit 208 to perform the authentication of the battery pack 20. Further, the CPU 202 controls the charge/discharge control circuit 210 to enable (release) the functions of the battery 22.

The bus interface 206 is preferably a SMBus interface. The bus interface 206 performs a process necessary for the battery control IC 200 to communicate with the host device 10 (built-in controller 100) via the bus BUS1.

The authentication circuit 208 is authentication hardware for authenticating whether the battery pack 20 is an authentic product or not. The authentication circuit 208 performs an operation for authentication of the battery pack 20 with the host device 10 (built-in controller 100) in accordance with the control of the CPU 202. In this case, the authentication circuit 208 is compatible with two authentication systems, i.e., the common key system and the public key system. In the first embodiment, as described above, the SHA256 system is used as the common key authentication system and the ECC system is used as the public key authentication system. However, the authentication systems to be used are not limited to these systems. That is, in the first embodiment, one authentication circuit 208 is configured to perform a process associated with the authentication in both the common key system and the public key system. This eliminates the need to provide authentication circuits for the common key system and the public key system, respectively. Accordingly, it is possible to reduce the installation space for the battery control IC 200.

The charge/discharge control circuit 210 is a circuit that controls charging and discharging of the battery 22. The charge/discharge control circuit 210 functions as an FFT control circuit to control the discharge switch 26 and the charge switch 28. The charge/discharge control circuit 210 controls each of the discharge switch 26 and the charge switch 28 to be turned on or off in accordance with the control of the CPU 202. Specifically, the charge/discharge control circuit 210 controls the discharge switch 26 to the turned on or off by a control signal Sg1, and the charge/discharge control circuit 210 controls the charge switch 28 to be turned on or off by a control signal Sg2.

More specifically, the charge/discharge control circuit 210 controls the discharge switch 26 to be turned on by setting the control signal Sg1, which is supplied to the gate of the transistor T1 (a MOSFET or the like), for example, from a low level to a high level. This allows the discharge current from the battery 22 to be supplied to the host device 10 via the diode D2 and the transistor T1. The charge/discharge control circuit 210 controls the charge switch 28 to be turned on by setting the control signal Sg2, which is supplied to the gate of the transistor T2 (a MOSFET or the like), for example, from the low level to the high level. This allows the charge current from the host device 10 to be supplied to the battery 22 via the diode D1 and the transistor T2.

The battery voltage detection circuit 212 measures voltages of battery cells B1 to B4 which constitute the battery 22. The voltage measurement results are converted into digital signals, and the digital signals are transmitted to the CPU 202. The CPU 202 stores the voltage measurement results in the memory 204.

The current integration circuit 214 measures a potential difference between both ends of the resistor element R1, thereby measuring charge/discharge current values of the battery 22. The current measurement results are converted into digital signals, and the digital signals are transmitted to the CPU 202. The CPU 202 stores the current measurement results in the memory 204.

(Authentication Process of the Battery Authentication System 1)

Figure 3:
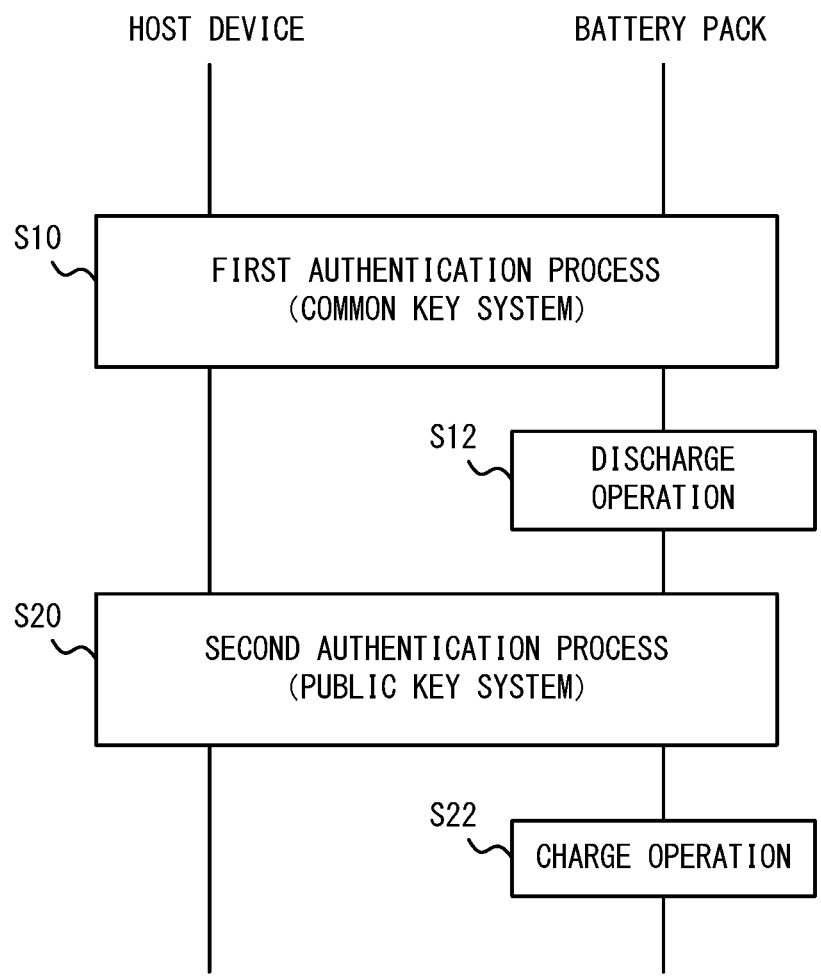
FIG. 3 is a sequence diagram showing an authentication process for a battery pack in the battery authentication system shown in FIG. 1.

FIG. 3 is a sequence diagram showing an authentication process for the battery pack 20 in the battery authentication system 1 shown in FIG. 1. As shown in FIG. 3, in the first embodiment, a first authentication process in the common key system is performed between the host device 10 and the battery pack 20 as a first step (step S10). When the authentication is established in the first authentication process, a discharge operation is performed in the battery pack 20 (step S12).

After the first authentication process is finished, a second authentication process in the public key system is performed between the host device 10 and the battery pack 20 as a second step (step S20). When the authentication is established in the second authentication process, a charge operation is performed in the battery pack 20 (step S22). In this manner, the two-step authentication process is carried out in the first embodiment. The first authentication process and the second authentication process will be described in detail below. The authentication process in the public key system requires a longer time than the authentication process in the common key system. In other words, the processing time in step S10 is shorter than the processing time in step S20.

In the first authentication process, assume that the host device 10 is not supplied with power from the external power supply and the power supply of the host device 10 is turned off. The battery pack 20 performs the discharge operation by the process of S12, thereby enabling the supply of power to the host device 10. In the first authentication process of S10, the built-in controller 100 is supplied with power from the built-in auxiliary power supply 108, to thereby perform the first authentication process. On the other hand, in the second authentication process of S20, the built-in controller 100 may be supplied with power from the auxiliary power supply 108, to thereby perform the second authentication process, or may be supplied with the power of the discharge current from the battery pack 20, to thereby perform the second authentication process.

(First Authentication Process and Discharge Operation)

Figure 4:
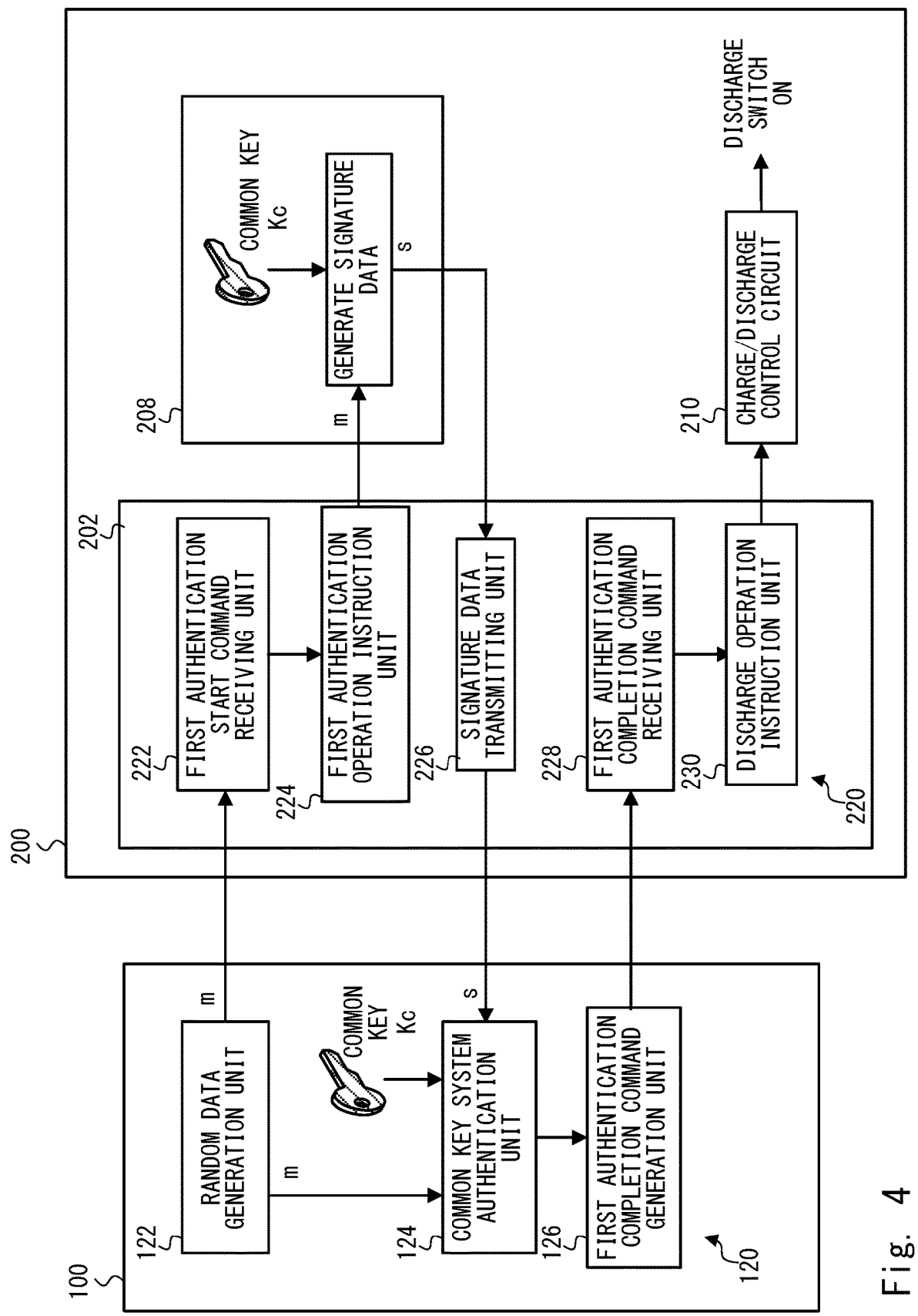
FIG. 4 is a functional block diagram for implementing a first authentication process and a discharge operation in the battery authentication system shown in FIG. 1.

FIG. 4 is a functional block diagram for implementing the first authentication process and the discharge operation in the battery authentication system 1 shown in FIG. 1. FIG. 4 illustrates functional blocks in each of the built-in controller 100 and the battery control IC 200.

A first authentication program 120 is executed in the built-in controller 100. The first authentication program 120 can be implemented by causing the CPU 102 to execute the program stored in the memory 104. The first authentication program 120 includes a random data generation unit 122, a common key system authentication unit 124, and a first authentication completion command generation unit 126. The operations of these units will be described later with reference to FIG. 5. The built-in controller 100 performs the first authentication process in the common key system by the first authentication program 120.

The CPU 202 of the battery control IC 200 executes a discharging control program 220. The discharging control program 220 can be implemented by causing the CPU 202 to execute the program stored in the memory 204. The discharging control program 220 includes a first authentication start command receiving unit 222, a first authentication operation instruction unit 224, a signature data transmitting unit 226, a first authentication completion command receiving unit 228, and a discharge operation instruction unit 230. The operations of these units will be described later with reference to FIG. 5. The CPU 202 instructs the authentication circuit 208 to perform the first authentication process in the common key system by the discharging control program 220. Further, the CPU 202 instructs the charge/discharge control circuit 210 to perform the discharge operation when the first authentication process is completed.

In this case, as shown in FIG. 4, in the first authentication process performed in the common key system, the host device 10 (built-in controller 100) and the battery pack 20 (battery control IC 200) include key information about a common key Kc which is common to the host device 10 and the battery pack 20. In the first authentication process, the host device 10 and the battery pack 20 (battery control IC 200) perform the first authentication process using the common key Kc.

Figure 5:
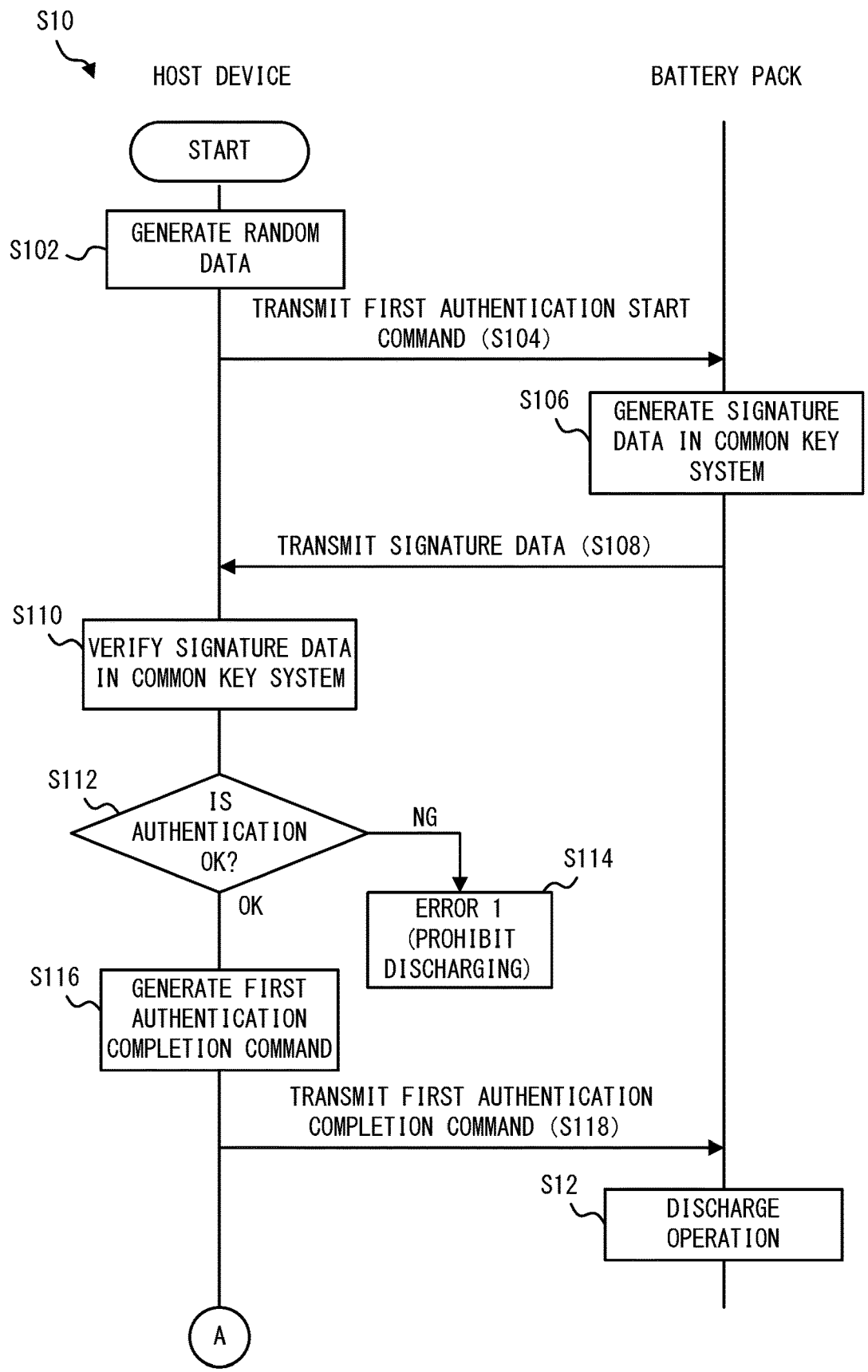
FIG. 5 is a sequence diagram showing details of the first authentication process performed between a host device and a battery pack.

FIG. 5 is a sequence diagram showing details of the first authentication process (step S10) performed between the host device 10 and the battery pack 20. The first authentication process is started in the host device 10. Specifically, the host device 10 starts the first authentication process when the battery pack 20 is mounted on the host device 10.

The random data generation unit 122 of the host device 10 generates random data (random number, challenge code) m (step S102). The random data generation unit 122 transmits a first authentication start command including the generated random data m to the battery control IC 200 of the battery pack 20 (step S104). The first authentication start command receiving unit 222 of the battery control IC 200 receives the first authentication start command, and outputs the first authentication start command to the first authentication operation instruction unit 224. At this time, the first authentication operation instruction unit 224 transmits random data m to the authentication circuit 208, and instructs the authentication circuit 208 to perform the first authentication process.

In the battery pack 20, the authentication circuit 208 generates signature data s from the random data m by using the common key Kc (step S106). The signature data s is generated in the common key system such as the SHA256 system. That is, the authentication circuit 208 is configured to perform the first authentication process in the common key system. The authentication circuit 208 transmits the generated signature data s to the signature data transmitting unit 226 of the battery control IC 200. The signature data transmitting unit 226 transmits the signature data s, which is acquired from the authentication circuit 208, to the built-in controller 100 of the host device 10 (step S108).

The common key system authentication unit 124 of the built-in controller 100 verifies the signature data s received from the battery pack 20 (step S110). Specifically, the common key system authentication unit 124 verifies the signature data s, which is received from the battery pack 20, by using the common key Kc. More specifically, the common key system authentication unit 124 acquires, from the random data generation unit 122, the random data m which is the same as the random data m generated in S102. The common key system authentication unit 124 generates signature data from the random data m, which is acquired from the random data generation unit 122, by using the common key Kc. Further, the common key system authentication unit 124 compares the signature data, which is generated by the common key system authentication unit 124, with the signature data a from the battery pack 20. When the signature data generated by the common key system authentication unit 124 matches the signature data s as a result of the comparison, i.e., when the signature data s from the battery control IC 200 is authentic data, the common key system authentication unit 124 determines that the first authentication is established (authentication OK). On the other hand, when the data do not match, i.e., when the signature data s from the battery control IC 200 is non-authentic data, the common key system authentication unit 124 determines that the first authentication is not established (authentication NG).

When it is determined that the first authentication is not established (authentication NG) ("NG" in step S112), the host device 10 determines that the battery pack 20, which is mounted on the host device 10, is a non-authentic product (error 1) (step S114). In this case, the use of the battery pack 20 is prohibited. Accordingly, discharging of the battery pack 20 is prohibited. Specifically, at this time, the host device 10 does not transmit any command indicating permission to discharge the battery pack 20. Therefore, the battery control IC 200 does not control the discharge switch 26 to be turned on, so that the battery pack 20 does not perform the discharge operation. Accordingly, the discharge current from the battery 22 is not supplied to the host device 10.

On the other hand, when it is determined that the first authentication is established (authentication OK) ("OK" in step S112), the first authentication completion command generation unit 126 of the built-in controller 100 generates a first authentication completion command (step S116). This first authentication completion command is a command for instructing the battery control IC 200 of the battery pack 20 to permit discharging of the battery 22. Further, the first authentication completion command generation unit 126 transmits the first authentication completion command to the battery control IC 200 of the battery pack 20 (step S118).

Upon receiving the first authentication completion command, the battery pack 20 performs the discharge operation (step S12). Specifically, the first authentication completion command receiving unit 228 receives the first authentication completion command from the built-in controller 100, and outputs the first authentication completion command to the discharge operation instruction unit 230. At this time, the discharge operation instruction unit 230 instructs the charge/discharge control circuit 210 to perform the discharge operation. Upon receiving the instruction to perform the discharge operation from the discharge operation instruction unit 230 (battery control IC 200), the charge/discharge control circuit 210 performs a process for turning on the discharge switch 26. The charge/discharge control circuit 210 may turn on the discharge switch 26 by, for example, setting the control signal Sg1 to the high level. That is, the charge/discharge control circuit 210 is configured to perform a control to enable the discharge operation when the first authentication is established. Accordingly, the battery pack 20 performs the discharge operation. The discharge operation of the battery pack 20 allows the discharge current to be supplied to the host device 10. As a result, the power supply of the host device 10 can be turned on.

(Second Authentication Process and Charge Operation)

Figure 6:
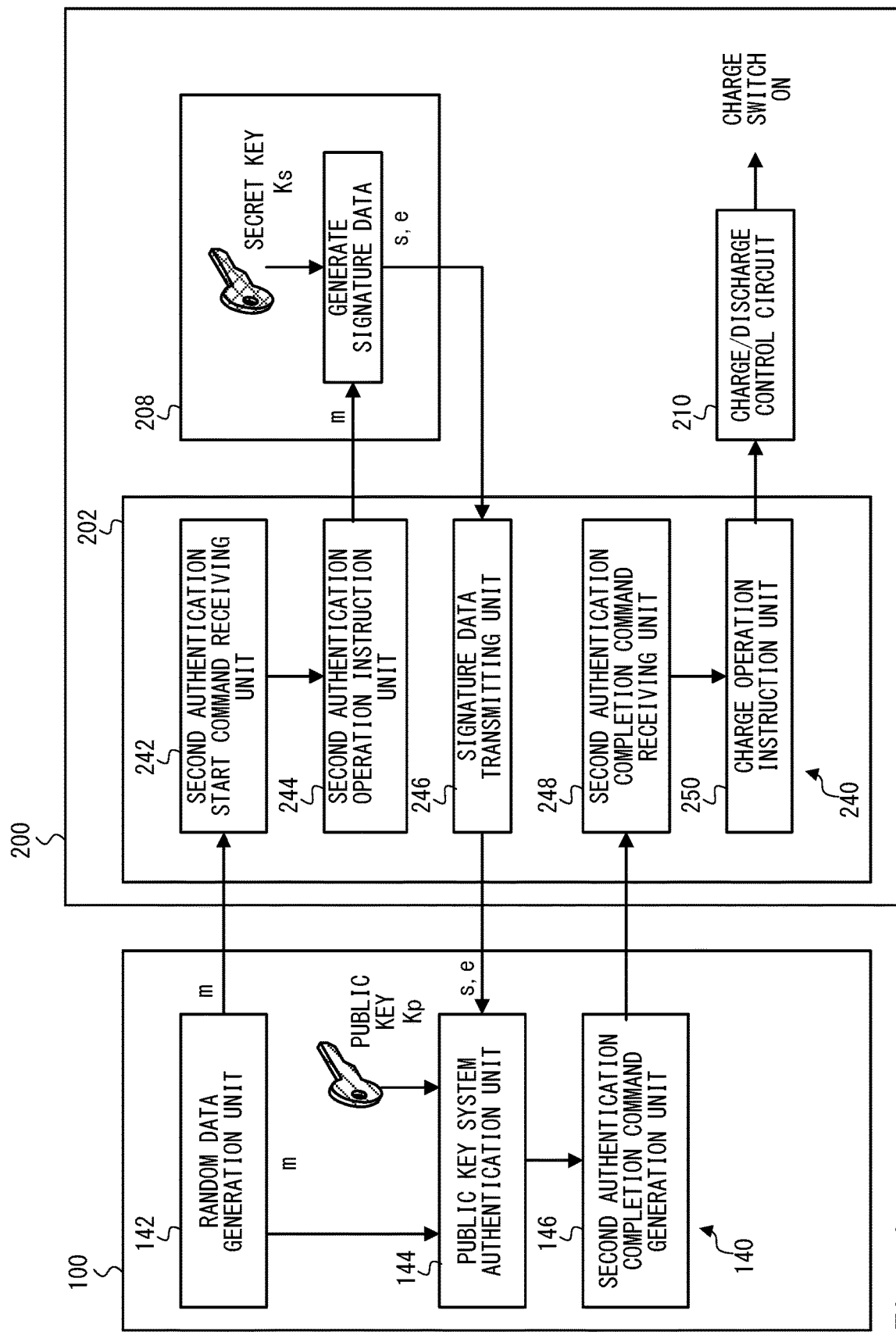
FIG. 6 is a functional block diagram for implementing a second authentication process and a charge operation in the battery authentication system shown in FIG. 1.

FIG. 6 is a functional block diagram for implementing the second authentication process and the charge operation in the battery authentication system 1 shown in FIG. 1. As with FIG. 4, FIG. 6 illustrates functional blocks in each of the built-in controller 100 and the battery control IC 200.

A second authentication program 140 is executed in the built-in controller 100. The second authentication program 140 can be implemented by causing the CPU 102 to execute the program stored in the memory 104. The second authentication program 140 includes a random data generation unit 142, a public key system authentication unit 144, and a second authentication completion command generation unit 146. The operations of these units will be described later with reference to FIG. 7. The built-in controller 100 performs the second authentication process in the public key system by the second authentication program 140.

A charging control program 240 is executed by the CPU 202 of the battery control IC 200. The charging control program 240 can be implemented by causing the CPU 202 to execute the program stored in the memory 204. The charging control program 240 includes a second authentication start command receiving unit 242, a second authentication operation instruction unit 244, a signature data transmitting unit 246, a second authentication completion command receiving unit 248, and a charge operation instruction unit 250. The operations of these units will be described later with reference to FIG. 7. The CPU 202 instructs the authentication circuit 208 to perform the second authentication process in the public key system by the charging control program 240. Further, the CPU 202 instructs the charge/discharge control circuit 210 to perform the charge operation when the second authentication process is completed.

In this case, as shown in FIG. 6, in the second authentication process performed in the public key system, the host device 10 (built-in controller 100) and the battery pack 20 (battery control IC 200) include different pieces of key information. Specifically, the built-in controller 100 includes key information about a public key Kp, while the battery control IC 200 includes key information about a secret key Ks corresponding to the public key Kp. In the second authentication process, the battery pack 20 performs the second authentication process using the secret key Ks and the host device 10 performs the second authentication process using the public key Kp.

Figure 7:
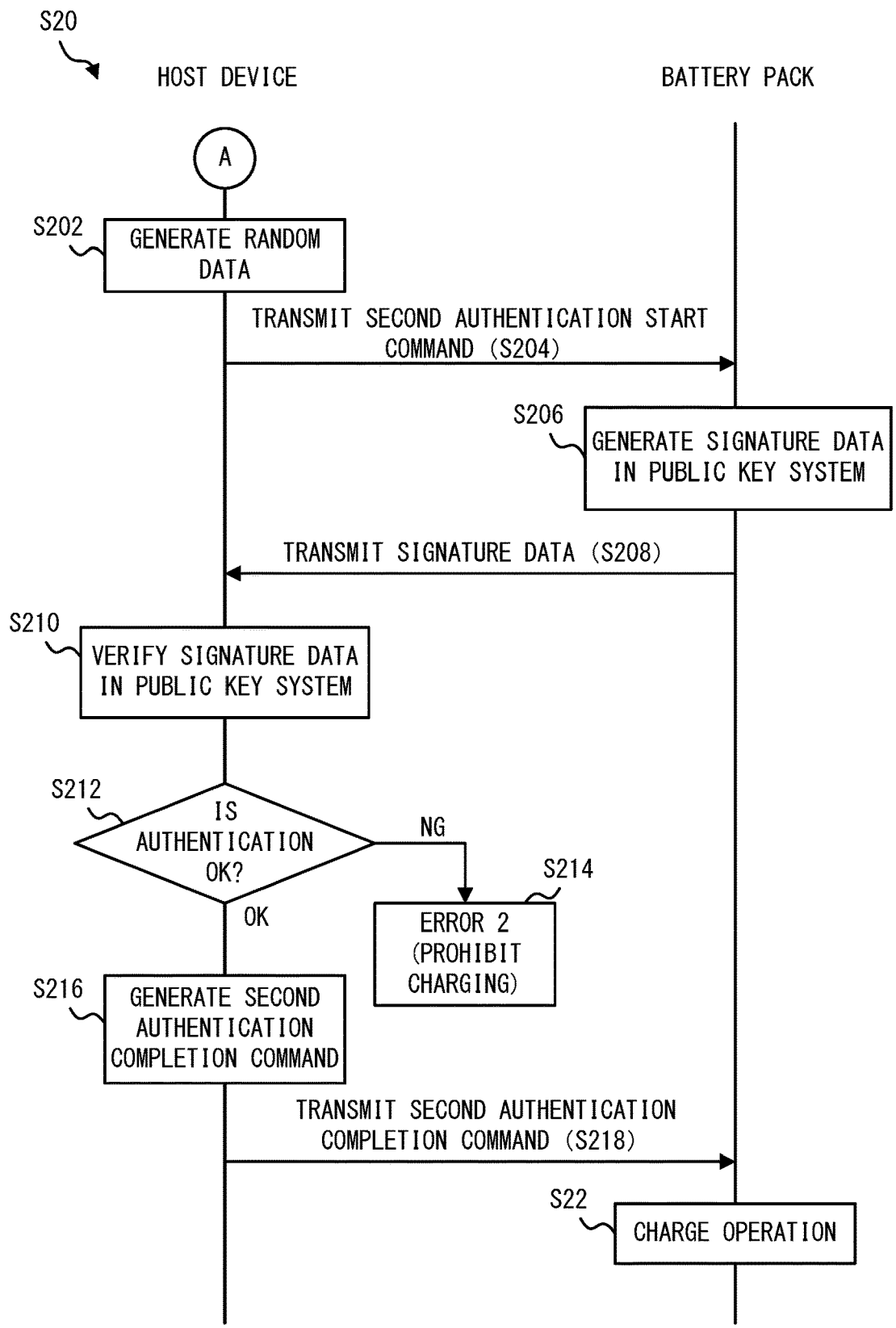
FIG. 7 is a sequence diagram showing details of the second authentication process performed between a host device and a battery pack.

FIG. 7 is a sequence diagram showing details of the second authentication process (step S20) performed between the host device 10 and the battery pack 20. The second authentication process is started in the host device 10 after the first authentication process is completed (i.e., after the first authentication is established). The description of steps similar to those of the first authentication process is simplified as appropriate.

The random data generation unit 142 generates the random data m (step S202). The random data generation unit 142 transmits a second authentication start command including the generated random data m to the battery control IC 200 (step S204). The second authentication start command receiving unit 242 of the battery control IC 200 receives the second authentication start command, and outputs the second authentication start command to the second authentication operation instruction unit 244. At this time, the second authentication operation instruction unit 244 transmits the random data m to the authentication circuit 208, and instructs the authentication circuit 208 to perform the second authentication process.

The authentication circuit 208 generates signature data in the public key system (step S206). Specifically, the authentication circuit 208 generates signature data s and e from the random data m by using the secret key Ks. The signature data s and e are generated in the public key system such as the ECC system. That is, the authentication circuit 208 is configured to perform the second authentication process in the public key system.

In this case, some operations are common to the signature data generation process in the SHA256 system and the signature data generation process in the ECC system. Therefore, the authentication circuit 208 which performs the signature data generation process in step S106 can also perform the signature data generation process in step S206. In other words, in the battery control IC 200, one authentication circuit 208 can perform two authentication processes, i.e., the first authentication and the second authentication. This eliminates the need to provide authentication circuits for the two authentication processes, respectively. Accordingly, it is possible to reduce the installation space for the battery control IC 200.

The authentication circuit 208 transmits the generated signature data s and e to the signature data transmitting unit 246. The signature data transmitting unit 246 transmits the signature data s and e, which are acquired from the authentication circuit 208, to the built-in controller 100 (step S208).

The public key system authentication unit 144 verifies the signature data s and e received from the battery pack 20 (step S210). Specifically, the public key system authentication unit 144 acquires, from the random data generation unit 142, the random data m which is the same as the random data m generated in S202. Further, the public key system authentication unit 144 verifies the signature data s and e by using the public key Kp and the random data m acquired from the random data generation unit 142. When the signature data s and e from the battery control IC 200 are authentic data as a result of the verification, the public key system authentication unit 144 determines that the second authentication is established (authentication OK). On the other hand, when the signature data s and e are non-authentic data as a result of the verification, the public key system authentication unit 144 determines that the second authentication is not established (authentication NG).

When it is determined that the second authentication is not established (authenticationNG) ("NG" in step S212), the host device 10 determines that the battery pack 20, which is mounted on the host device 10, is a non-authentic product (error 2) (step S214). In this case, concerning the use of the battery pack 20, only discharging of the battery pack 20 is permitted and charging of the battery pack 20 is prohibited. Specifically, at this time, the host device 10 does not transmit any command indicating permission to charge the battery pack 20. Therefore, the battery control IC 200 does not control the charge switch 28 to be turned on, so that the battery pack 20 does not perform the charge operation. Accordingly, the charge current from the host device 10 is not supplied to the battery 22.

On the other hand, when it is determined that the second authentication is established (authentication OK) ("OK" in step S212), the second authentication completion command generation unit 146 generates a second authentication completion command (step S216). This second authentication completion command is a command for instructing the battery control IC 200 to permit charging of the battery 22. Further, the second authentication completion command generation unit 146 transmits the second authentication completion command to the battery control IC 200 (step S218).

Upon receiving the second authentication completion command, the battery pack 20 performs the charge operation (step S22). Specifically, the second authentication completion command receiving unit 248 receives the second authentication completion command from the built-in controller 100, and outputs the second authentication completion command to the charge operation instruction unit 250. At this time, the charge operation instruction unit 250 instructs the charge/discharge control circuit 210 to perform the charge operation. Upon receiving the instruction to perform the charge operation from the charge operation instruction unit 250, the charge/discharge control circuit 210 performs a process for turning on the charge switch 28. The charge/discharge control circuit 210 may turn on the charge switch 28 by, for example, setting the control signal Sg2 to the high level. That is, the charge/discharge control circuit 210 is configured to perform a control to enable the charge operation when the second authentication is established. Accordingly, the battery pack 20 performs the charge operation. The charge operation of the battery pack 20 allows the battery pack 20 to be supplied with the charge current from the host device 10. Thus, the battery 22 of the battery pack 20 can be charged.

In practice, the charge current is supplied from the host device 10 to the battery pack 20 when the power supply plug 14 is connected to the outlet of the AC power supply and the host device 10 is supplied with power from the external power supply. Accordingly, if the host device 10 is not supplied with power from the external power supply in step S22, the battery pack 20 is not supplied with the charge current, but stands by in a chargeable state. When the host device 10 is supplied with power from the external power supply, the battery pack 20 is supplied with the charge current.

Comparison Between the Comparative Example and the First Embodiment

When the authentication is performed using only the public key system as the authentication system as in the comparative example described above, the following problem may occur. That is, when the host device is not supplied with power from the external power supply, it is necessary for the host device to be supplied with power from the battery pack so that the power supply of the host device is turned on. However, in the authentication system using the public key system, it takes a long time until the battery pack is connected to the host device and the host device is supplied with power from the battery pack. In particular, when the low-end controller is adopted as the built-in controller 100, a long time of about 30 seconds is required.

On the other hand, as described above, the first embodiment provides a configuration in which discharging of the battery pack 20 is permitted when the authentication in the common key system is established. In this case, the authentication process in the common key system requires a short time of about 0.5 seconds. Thus, unlike in the comparative example, the time required until the battery pack is connected to the host device and the host device is supplied with power from the battery pack can be shortened in the first embodiment. Further, the time required until the battery pack is connected to the host device and the host device is supplied with power from the battery pack can be shortened even when the low-end controller is adopted as the built-in controller 100. Therefore, the low-end controller can be adopted as the built-in controller 100, which leads to a reduction in the cost of the built-in controller 100.

As described above in the comparative example, when charging is permitted by the authentication process in the common key system, the authentication time is short, but the security level is lower than that of the public key system. When the battery pack is a non-authentic product, there is no adverse effect in discharging of the battery pack because the discharge current is simply supplied from the (non-authentic) battery pack to the host device. On the other hand, charging of the non-authentic battery pack may cause an overcurrent or overheating, which may result in the occurrence of a failure in electronic devices. Accordingly, it is preferable to provide a higher security level for the authentication to permit charging. The first embodiment provides a configuration in which charging of the battery pack is permitted when the authentication using the public key system with a higher security level than that of the common key system is established. Accordingly, in the first embodiment, the security level for the permission of charging can be enhanced, which contributes to an improvement in preventive measures against non-authentic products (counterfeit products).

The first embodiment also provides a configuration in which the second authentication process is performed after the first authentication is established. In other words, in the first embodiment, the first authentication process is performed prior to the second authentication process. It is necessary for the host device 10, which is not supplied with power from the external power supply, to be first supplied with the power, i.e., the discharge current from the battery pack 20. In other words, the discharge operation of the battery pack 20 is performed with a higher priority than the charge operation of the battery pack 20. Accordingly, in the first embodiment, the discharge function with a higher priority can be rapidly put into an available state.

Modified Example

The present invention is not limited to the embodiment described above and can be modified in various ways without departing from the scope of the invention. For example, in semiconductor devices, such as the built-in controller 100 and the battery control IC 200 according to the embodiment described above, the conductivity type (p-type or n-type) of a semiconductor substrate, a semiconductor layer, a diffusion layer (diffusion region), and the like may be reversed. Accordingly, when one of the conductivity types of the n-type and the p-type is defined as a first conductivity type and the other conductivity type is defined as a second conductivity type, the first conductivity type may be the p-type and the second conductivity type may be the n-type. On the contrary, the first conductivity type may be the n-type and the second conductivity type may be the p-type.

In the embodiment described above, the challenge-response system is used as the battery pack authentication method in the first authentication and the second authentication. However, the authentication method is not limited to this system. Any other method may be used as long as it can authenticate a battery pack.

In the embodiment of the present invention, the SHA256 system is used as the common key authentication system, but the common key authentication system is not limited to the SHA256 system. In the embodiment of the present invention, the ECC system is used as the public key authentication system, but the public key authentication system is not limited to the ECC system. Note that when some operations are common to the common key authentication system and the public key authentication system, one authentication circuit can perform two authentication processes (the common key authentication system and the public key authentication system). This makes it possible to reduce the installation space for the battery control IC, unlike in the case where authentication circuits are provided for the common key authentication system and the public key authentication system, respectively.

Furthermore, in the embodiment of the present invention, the common key authentication system is used for the first authentication and the public key authentication system is used for the second authentication. However, the authentication systems to be used are not limited to these authentication systems. Any authentication system can be used for the first authentication as long as the processing speed of the authentication system is higher than that of the authentication system for the second authentication, even though the security level of the authentication system is lower than that of the authentication system for the second authentication. To put it another way, any authentication system can be used for the second authentication as long as the security level of the authentication system is higher than that of the authentication system for the first authentication, even though the processing speed of the authentication system is lower than that of the authentication system for the first authentication.

The host device 10 is not limited to an electronic device such as a laptop computer. Any electronic device which can incorporate a controller, such as the built-in controller 100, may be used as the host device 10. For example, the host device 10 may be an electric power tool, such as an electric drill, an electric motorcycle, or an uninterruptible power supply (UPS).

According to the embodiment described above, in the battery control IC 200, the CPU 202 controls the authentication circuit 208 and the charge/discharge control circuit 210. However, the configuration of the battery control IC 200 is not limited to this. In the battery control IC 200, the CPU 202 is not an indispensable component. On the other hand, since the built-in controller 100 of the host device 10 performs the authentication process by software, the use of the CPU 202 makes it possible to control each circuit more efficiently when the battery control IC 200 and the built-in controller 100 communicate with each other.

The invention made by the present inventors has been described in detail above based on the embodiment. However, the present invention is not limited to the above embodiment and can be modified in various ways without departing from the scope of the invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A battery authentication system, comprising:
    a battery pack; and
    a host device connected to the battery pack to charge the battery pack,
    wherein the battery pack comprises:
        a battery;
        a discharge switch that turns on and off discharging of the battery;
        a charge switch that turns on and off charging of the battery; and
        a control integrated circuit (IC) that controls the battery,
    wherein the control IC includes:
        a charge/discharge control circuit that controls the discharge switch and the charge switch; and
        an authentication circuit that performs a process for performing an authentication with the host device,
    wherein the authentication circuit is configured to perform a process associated with a first authentication,
    wherein the charge/discharge control circuit is configured to control the discharge switch to be turned on when the first authentication is established,
    wherein the authentication circuit is configured to perform a process associated with a second authentication, and
    wherein the charge/discharge control circuit is configured to control the charge switch to be turned on when the second authentication is established after the first authentication.

2. The battery authentication system according to claim 1, wherein a security level of the second authentication is higher than a security level of the first authentication.

3. The battery authentication system according to claim 2, wherein a processing time of the first authentication is shorter than a processing time of the second authentication.

4. The battery authentication system according to claim 1, wherein a processing time of the first authentication is shorter than a processing time of the second authentication.

5. The battery authentication system according to claim 1, wherein the first authentication is performed in a common key system.

6. The battery authentication system according to claim 1, wherein the first authentication is performed in a public key system.

7. The battery authentication system according to claim 1, wherein a processing speed of the second authentication is less than a processing speed of the first authentication.

8. The battery authentication system according to claim 1, wherein a discharge operation of the battery pack is performed with a higher priority than a charge operation of the battery pack.

9. The battery authentication system according to claim 1, wherein the first authentication is established before the second authentication is performed.

10. The battery authentication system according to claim 1, wherein the host device includes a built-in controller that performs a management of a power supply of the host device and the first authentication and the second authentication of the battery pack.

11. The battery authentication system according to claim 1, wherein the host device charges the battery pack by a power supplied from an external power supply.

12. The battery authentication system according to claim 11, wherein the host device comprises an auxiliary power supply, such that, when the host device is not supplied with the power from the external power supply, the host device is supplied with a power from the auxiliary power supply to perform the first authentication and the second authentication.

13. A battery authentication system, comprising:
    a control integrated circuit (IC) that controls a battery of an energy storage device; and
    a host device connected to the energy storage device to charge the energy storage device,
    wherein the control IC includes:
        a charge/discharge control circuit that controls a discharge switch and a charge switch; and
        an authentication circuit that performs a process for performing an authentication with the host device,
    wherein the authentication circuit is configured to perform a process associated with a first authentication,
    wherein the charge/discharge control circuit is configured to control the discharge switch to be turned on when the first authentication is established,
    wherein the authentication circuit is configured to perform a process associated with a second authentication, and
    wherein the charge/discharge control circuit is configured to control the charge switch to be turned on when the second authentication is established after the first authentication.

14. The battery authentication system according to claim 13, wherein a security level of the second authentication is higher than a security level of the first authentication.

15. The battery authentication system according to claim 14, wherein a processing time of the first authentication is shorter than a processing time of the second authentication.

16. The battery authentication system according to claim 13, wherein a processing time of the first authentication is shorter than a processing time of the second authentication.

17. The battery authentication system according to claim 13, wherein the first authentication is performed in a common key system.

18. The battery authentication system according to claim 13, wherein the first authentication is performed in a public key system.

19. The battery authentication system according to claim 13, wherein a processing speed of the second authentication is less than a processing speed of the first authentication.

20. The battery authentication system according to claim 13, wherein the first authentication is established before the second authentication is performed.

* * * * *